(12) United States Patent
Anzai

(10) Patent No.: US 7,520,361 B2
(45) Date of Patent: Apr. 21, 2009

(54) TENSIONING APPARATUS FOR A DRIVE LOOP MEMBER ON A VEHICLE, AND METHOD OF USING SAME

(75) Inventor: Seiji Anzai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 777 days.

(21) Appl. No.: 11/221,501

(22) Filed: Sep. 8, 2005

(65) Prior Publication Data

US 2006/0055147 A1    Mar. 16, 2006

(30) Foreign Application Priority Data

Sep. 10, 2004    (JP) .............................. 2004-264262

(51) Int. Cl.
*B62K 11/00* (2006.01)
(52) U.S. Cl. ...................... 180/231; 180/227
(58) Field of Classification Search ................. 180/231, 180/227, 219
See application file for complete search history.

(56) References Cited

U.S. PATENT DOCUMENTS

| | | | | |
|---|---|---|---|---|
| 4,540,062 A | * | 9/1985 | Kashiwai | 180/227 |
| 4,967,867 A | * | 11/1990 | Fuller | 180/219 |
| 5,240,087 A | * | 8/1993 | Parker | 180/231 |
| 5,546,665 A | * | 8/1996 | Jackmauh | 33/203 |
| 6,315,071 B1 | * | 11/2001 | Gogo | 180/219 |
| 6,481,523 B1 | * | 11/2002 | Noro et al. | 180/227 |
| 7,137,468 B2 | * | 11/2006 | Siddle | 180/227 |
| 7,287,772 B2 | * | 10/2007 | James | 280/288 |

FOREIGN PATENT DOCUMENTS

JP    SHO 64-67494    3/1989

* cited by examiner

*Primary Examiner*—Paul N Dickson
*Assistant Examiner*—Michael R Stabley
(74) *Attorney, Agent, or Firm*—Carrier, Blackman & Associates, P.C.; Joseph P. Carrier; William D. Blackman

(57) ABSTRACT

A tension-adjusting mechanism for adjusting tension on an endless loop member associated with a driven transmission gear is operable to adjust the tension of an endless loop member on a vehicle. The tension-adjusting mechanism is made compact to reduce weight of the vehicle. In particular, the rear end of an arm of a frame rear fork includes an elongated adjustment slot, and one end of an axle, passed through the adjustment slot, is supported by a slider. The rear end of the fork is provided with a projecting portion on a front side relative to the slider, and a tension-adjusting bolt is threadably engaged with a threaded hole provided in the projecting portion. The shank portion of the tension-adjusting bolt is provided with an anti-turn recessed portion, and a click ball is engaged with and disengaged from the anti-turn recessed portion while being spring-biased to engagement therewith, whereby the click ball, in cooperation with the anti-turn recessed portion, serves as an anti-turn section for the tension-adjusting bolt.

20 Claims, 7 Drawing Sheets

TENSIONING APPARATUS FOR A DRIVE LOOP MEMBER ON A VEHICLE, AND METHOD OF USING SAME

CROSS-REFERENCE TO RELATED APPLICATIONS

The present invention claims priority under 35 USC 119 based on Japanese patent application No. 2004-264262, filed on Sep. 10, 2004. The subject matter of this priority document is incorporated by reference herein.

BACKGROUND OF THE INVENTION

1. Field of the Invention

The present invention relates to a driven transmission gear operable to adjust the tension of a drive chain or belt in a motorcycle or the like, and particularly to an anti-turn structure advantageous for use with a tension-adjusting bolt for moving an axle of a drive wheel.

2. Description of the Background Art

It is well known to provide a tension-adjusting bolt to adjust the tension of a chain on a motorcycle or the like. In this case, the axle of a drive wheel is moved by operating a tension-adjusting bolt, thereby increasing or decreasing slack in the drive chain. Also, it is known to provide the axle of a drive wheel with a stride lock. The stride lock is penetrated by the axle and is provided with a slit. The axle extends in the left-right direction of the vehicle. A tension-adjusting bolt passes through the slit portion so as to extend in the front-rear direction of the vehicle. Rotation of the tension-adjusting bolt is permitted by opening the slit through adjusting the fastening force for the axle, and the rotation of the tension-adjusting bolt is stopped by closingly fastening the slit. Such a structure is disclosed, for example, in Japanese Laid-open Patent publication No. 64-67494.

In such a wheel support portion, an anti-turn structure is necessary for preventing the tension-adjusting bolt from being slackened by vibrations. The tension-adjusting bolt is generally fixed by use of a double nut. However, such an approach leads to an increase in the number of component parts by the number relevant to the double nut, and the number of manufacturing steps is increased by the double nut fastening operation.

In addition, according to Japanese Laid-open Patent publication No. 64-67494, the double nut can be omitted, but in this case, the slit is formed in the stride lock is required to have a comparatively high strength for supporting the axle, leading to a lowering in the strength of the stride lock. As a result, it is necessary to raise the strength of the stride lock and other member(s), which, in turn, leads to an increase in the overall weight of the wheel support portion.

In view of the foregoing, it is an object of the present invention to make it possible to omit a double nut without causing an increase in weight in a tension adjustment structure in a wheel support portion of a driven transmission gear.

SUMMARY OF THE INVENTION

In order to solve the above problems, an inventive tension-adjusting mechanism is provided, for adjusting the position of a driven transmission gear, in order to adjust the tension of a drive chain of a vehicle. A first aspect of the invention pertains to a driven transmission gear including an endless drive chain or belt providing connection between a power unit and a drive wheel. Also included are a wheel support arm provided with an adjustment slot extending in the front-rear direction of the vehicle, an axle for the drive wheel, the axle inserted through the adjustment slot, and a tension-adjusting bolt for connection between the wheel support arm and the axle. The axle is moved in the front-rear direction of the vehicle by rotating the tension-adjusting bolt to thereby adjust the tension of the chain or belt. A first aspect of the present invention is characterized in that the tension-adjusting bolt is provided with an anti-turn recessed portion, and a lock member which is elastically engageable with, and disengageable from the anti-turn recessed portion. The turning of the tension-adjusting bolt is stopped by engagement of the lock member with the anti-turn recessed portion.

A second aspect of the invention is characterized in that, in addition to the first aspect, a plurality of the anti-turn recessed portions are provided in a shank portion of the tension-adjusting bolt at appropriate intervals along the rotating direction.

A third aspect of the invention is characterized in that, in addition to the first aspect, the anti-turn recessed portion is a recessed groove formed in a shank portion of the tension-adjusting bolt, the recessed groove extending substantially continuously in the axial direction thereof from the tip of the bolt shank to the head of the bolt.

According to the first aspect of the invention, the anti-turn recessed portion is provided in the shank portion of the tension-adjusting bolt, and the lock member, biased by an elastic force, is engaged with and disengaged from the anti-turn recessed portion, whereby an anti-turn function for the tension-adjusting bolt can be provided by the lock member. As a result, the double nut used in the related art can be omitted. Moreover, the engaging and disengaging operations are performed swiftly and easily, saving labor as compared with the use of a double nut, and a quick adjustment operation by a click operation can be performed. In addition, since the double nut only can be eliminated from the structure without any considerable change in the remaining axle support structure as compared with the related art, an increase in the weight of the axle support structure is not caused, and a reduction in weight is possible.

According to the second aspect of the invention, a plurality of anti-turn recessed portions are provided in the shank portion of the tension-adjusting bolt at intervals along the rotating direction, so that engagement with and disengagement with the anti-turn recessed portion can be achieved by a rotating amount less than a full rotation of the tension-adjusting bolt. Therefore, the tension adjustment can be performed more accurately.

According to a third aspect of the invention, the anti-turn recessed portion is formed as a recessed groove extending continuously in the axial direction of the tension-adjusting bolt along the entire length thereof, so that the anti-turn recessed portion can be formed easily. In addition, an anti-turn function can be obtained at an arbitrary position in the axial direction.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION OF THE ILLUSTRATIVE EMBODIMENTS

Figure 1:
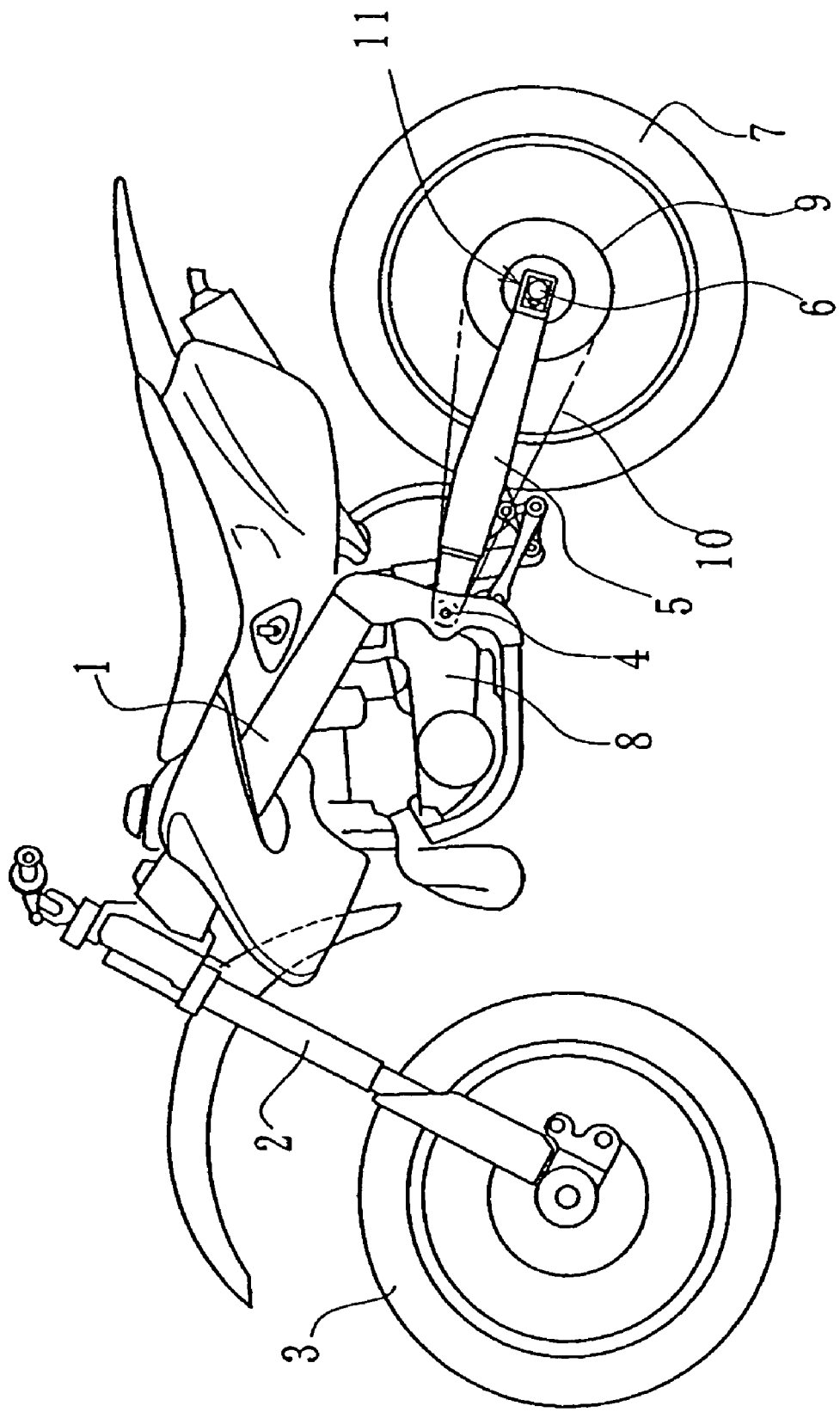
FIG. 1 is a side plan view of a motorcycle to which a tension-adjusting mechanism according to the present invention has been applied, showing a rear wheel axle including a driven transmission gear adjustably supported on a rear fork of the vehicle frame.

A specific embodiment to which the present invention is applied will be described below, with reference to the accompanying drawings. It should be understood that only structures considered necessary for clarifying the present invention are described herein. Other conventional structures, and those of ancillary and auxiliary components of the system, are assumed to be known and understood by those skilled in the art. FIG. 1 is a side plan view of a motorcycle to which a tensioning mechanism according to an illustrative embodiment of the present invention has been applied, in which a front wheel 3 is supported on a front portion of a vehicle body frame 1 through a front fork 2. At a rear portion of the vehicle body frame 1, a rear wheel 7 is supported through an axle 6 on rear end portions of a rear fork 5 (the rear fork can also be described as a swing arm). The front end of the rear fork 5 is swingably supported by a pivot shaft 4.

A chain 10 is wrapped around both an output portion (not shown in the figure) of a power unit 8, supported on the vehicle body frame 1, and a sprocket 9 of the rear wheel 7. The rear wheel 7 is a drive wheel, and the chain 10 is an example of an endless drive loop member, which may be a provided as either a chain or belt. The axle 6 is provided with a tension-adjusting mechanism 11 for adjusting the tension of the chain 10 by movements thereof. Details of the tension-adjusting mechanism 11 will be described subsequently herein.

Figure 2:
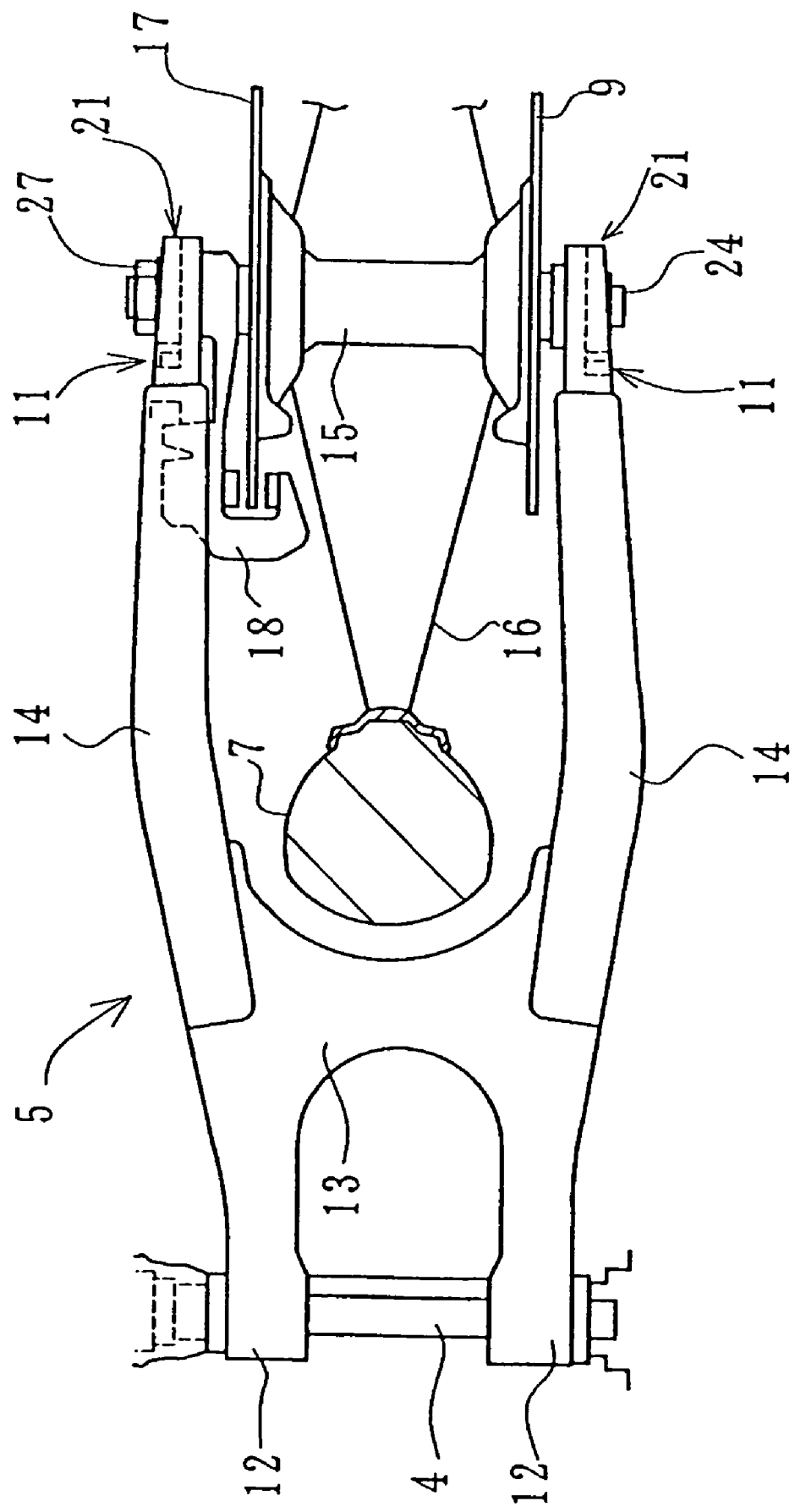
FIG. 2 is a top plan view of the rear fork of FIG. 1, showing a rear wheel support portion.

FIG. 2 is a top plan view showing a support portion for the rear fork 5 and the rear wheel 7. The rear fork 5 has bearing portions 12, 12 for the pivot shaft 4 at the left and right of a front end portion thereof. The rear end of the rear fork includes a left-right pair of arms 14, 14 which correspond to wheel support arms. Front end portions of the left-right pair of arms 14, 14 extending to the rear side of a cross portion 13 connecting the left and right bearing portions 12, 12 to each other are formed to be integral with the cross portion 13.

The rear wheel 7 is contained in the space between the left and right arms 14, 14. The rear wheel 7 includes a hub 15, and a plurality of spokes 16. The sprocket 9 is mounted to a vehicle body left-side end portion of the hub 15, and a brake disk 17 is mounted to a vehicle body right-side end portion of the hub 15. A brake caliper 18 is mounted adjacent to the brake disk 17.

Figure 3:
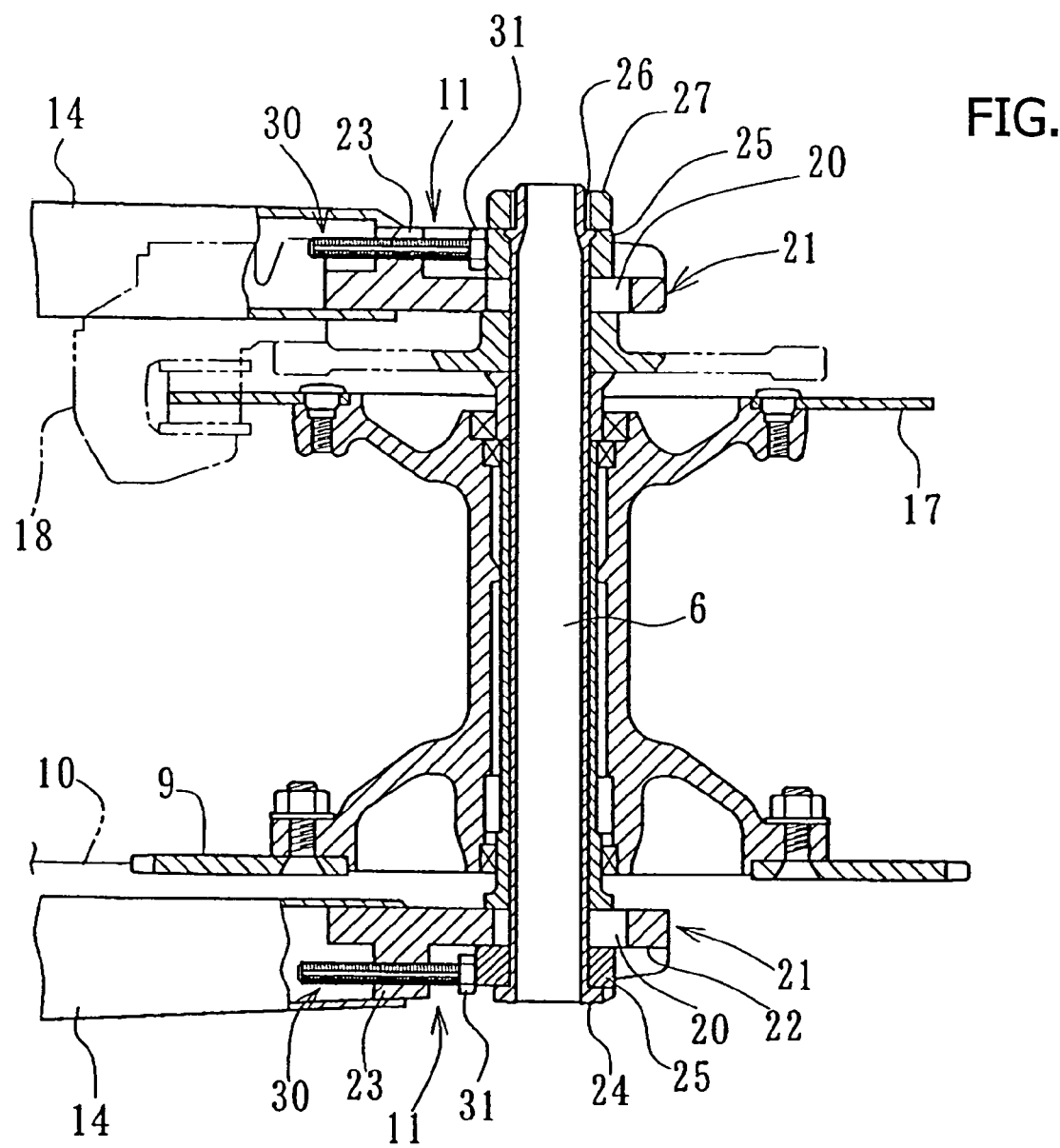
FIG. 3 is a horizontal sectional view of the rear wheel support portion of FIG. 2, showing an adjusting bolt provided on an end portion of each arm of the rear fork such that the adjusting bolt head abuts the rear wheel axle, and the adjusting bolt shank is threadably received within the end portion an arm of the rear fork.

FIG. 3 shows a horizontal cross section of the axle 6 at a rear wheel support portion. The axle 6 penetrates through a tubular portion of the hub 15, and penetrates through adjusting slots 20, 20 which are formed at rear end portions of the arms 14, 14, and which are elongated in the front-rear direction of the vehicle. The portion where the adjusting slot 20 is formed is a flat plate portion 22 of an end piece 21 fitted to, and fixed by welding to, a rear end portion of the arm 14 which is angular pipe-like in shape.

The end piece 21 is formed with a projecting portion 23 thereon, which extends laterally outwardly on the front side of the end piece 21, relative to the adjusting slot 20. The projecting portion 23 is provided with a threaded hole (described later) formed therein and penetrating therethrough in the front-rear direction of the vehicle. One end side of the axle 6, which is elongated and bolt-like in shape, constitutes a head portion 24, which is located on the outside of the adjusting slot 20, and which clamps a slider 25 between itself and the flat plate portion 22 of the end piece 21.

The other end of the axle 6 constitutes a screw portion 26, to which an axle nut 27 is fastened. The axle nut 27 clamps a slider 25 between itself and the flat plate portion 22. When the axle nut 27 is fastened tightly, the slider 25 is immovably fixed, and when the axle nut 27 is unfastened, the slider 25 is permitted to move, making it possible to adjust the position of the axle.

Figure 4:
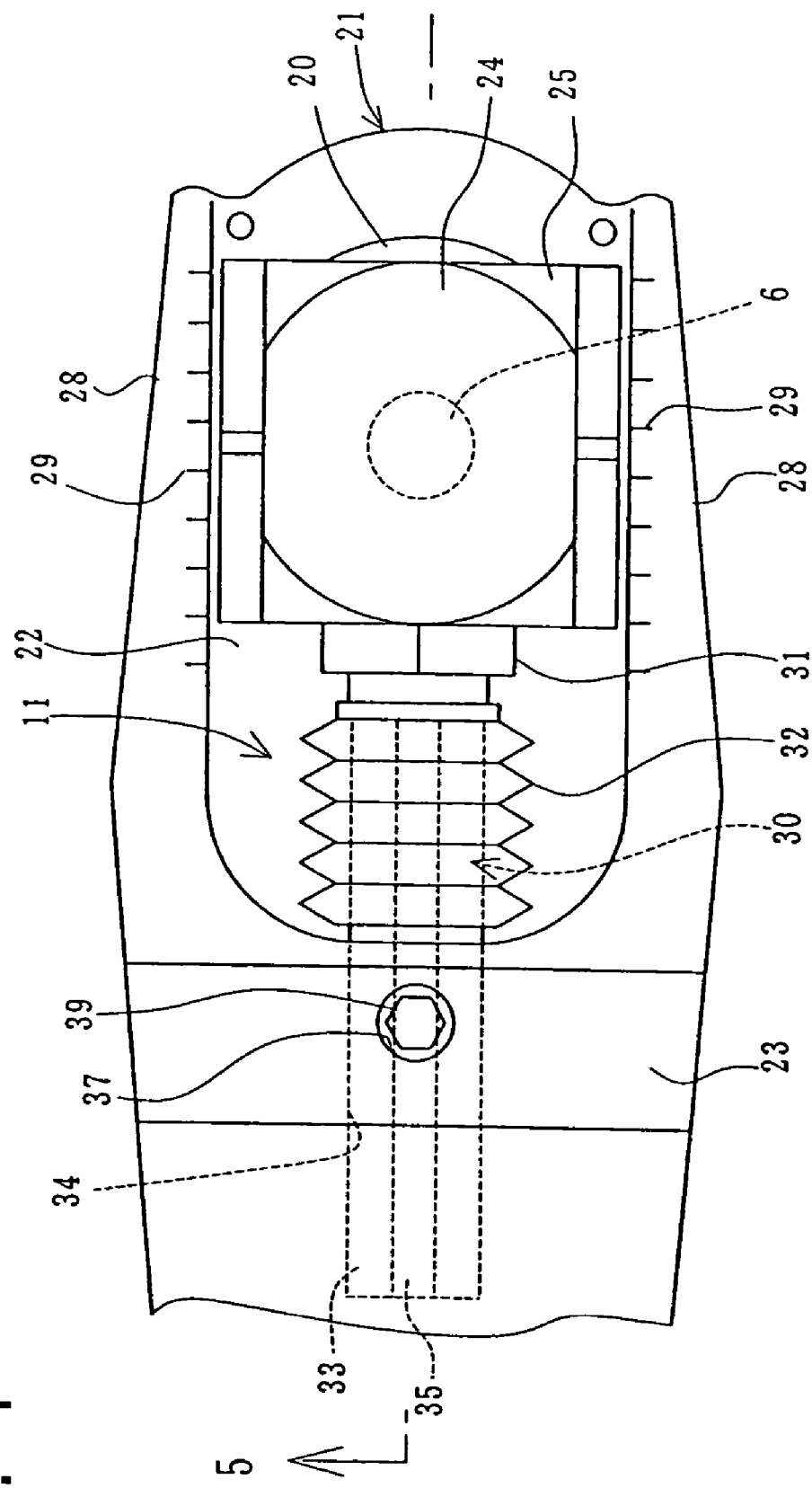
FIG. 4 is a side plan view of the adjusting mechanism, showing the rubber boot surrounding the exposed portion of the shank of the adjusting bolt.
Figure 5:
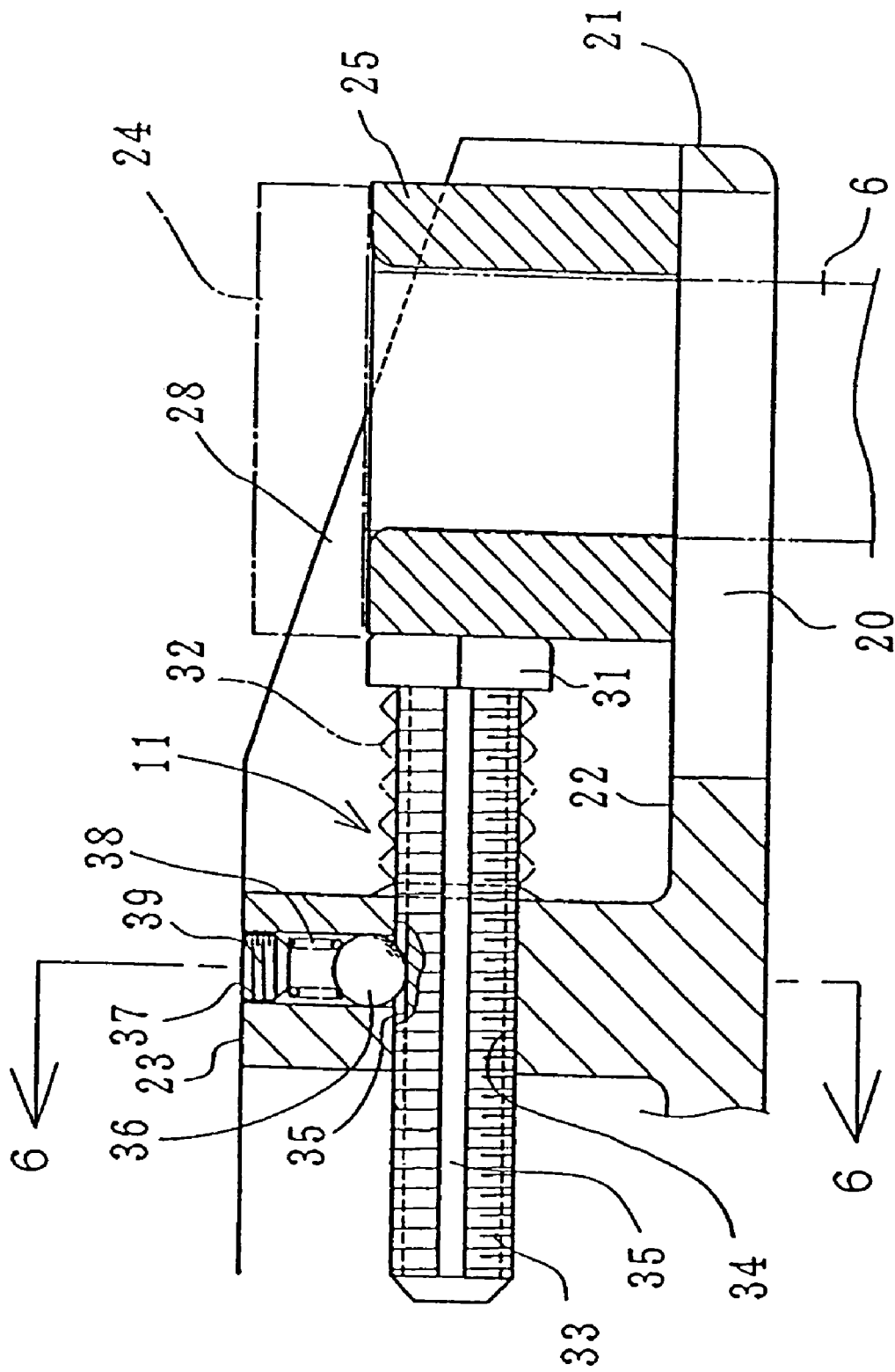
FIG. 5 is a sectional view along line 5-5 of FIG. 4, showing a spring-loaded click ball received within one of plural axially-extending grooves formed in the surface of the shank of the adjusting bolt.

FIG. 4 is an enlarged side view of the adjusting mechanism 11, and FIG. 5 is a sectional view along line 5-5 of FIG. 4. First, in FIG. 4, with the axle nut 27 in a slackened state, the slider 25 can be moved in the front-rear direction of the vehicle while being positioned in the upper-lower direction between ribs 28, 28 set parallel on the upper and lower sides of the flat plate portion 22. The ribs 28, 28 are provided on their end faces with graduations 29 for indicating the position of the axle 6.

A tension-adjusting bolt 30 penetrates through the projecting portion 23 in the front-rear direction of the vehicle, and is mounted to the projecting portion 23 so as to be advanceable and retractable by screw thread engagement therewith. The tension-adjusting bolt 30 is disposed with its head portion 31 abutting the front end of the slider 25. When the tension-adjusting bolt 30 is retracted by reverse rotation in the condition where the slider 25 is movable, the slider 25 is moved rearwards, and the axle 6 supported by the slider 25 is moved as one body with the slider 25 rearwards within the adjusting slot 20, to adjust, or raise, the tension of the chain 10. On the other hand, when the tension-adjusting bolt 30 is advanced by normal rotation, the tension of the chain 10 is lowered (slackened).

A bellows-form rubber boot 32 is disposed about the shank, or screw portion 33, of the tension-adjusting bolt 30, between the head portion 31 and the projecting portion 23, so as to cover the periphery of the exposed portion thereof, to prevent mud or the like from being scattered onto the tension-adjusting bolt 30.

As shown in FIG. 5, a screw portion 33 of the tension-adjusting bolt 30 penetrates through a threaded hole 34 of the projecting portion 23 in the front-rear direction of the vehicle.

The threaded hole 34 is provided in its inner peripheral surface with female screw threads, which engage with the male screw portion 33 of the tension-adjusting bolt 30. Accordingly, normal rotation or reverse rotation of the screw portion 33 advances or retracts the tension-adjusting bolt 30, relative to the projecting portion 23. The screw portion 33 is provided, in the range from under the neck of the head portion 31 to the tip end thereof, with an anti-turn recessed groove 35 therein, which is a recessed groove extending continuously along the outer surface thereof, in the axial direction of the bolt 30.

A click ball 36 is engageable in and disengageable from the anti-turn recessed groove 35. The click ball 36 is contained in a click hole 37 bored inward from the surface of the projecting portion 23 so as to communicate with the threaded hole 34. The click ball 36 is biased by a coil spring 38 residing within the click hole 37, so that the click ball projects partially into the threaded hole 34, and is engaged with the anti-turn recessed groove 35.

The coil spring 38 is fixed at its one end by a plug 39 which is inserted from side of an end portion opened in the surface of the projecting portion 23. The plug 39 is provided with a strong anaerobic adhesive, and seals the inside of the click hole 37 when fastened. The click ball 36 is a greased steel ball, and outflow of the grease to the surface of the projecting portion 23 is prevented by the plug 39.

Figure 6:
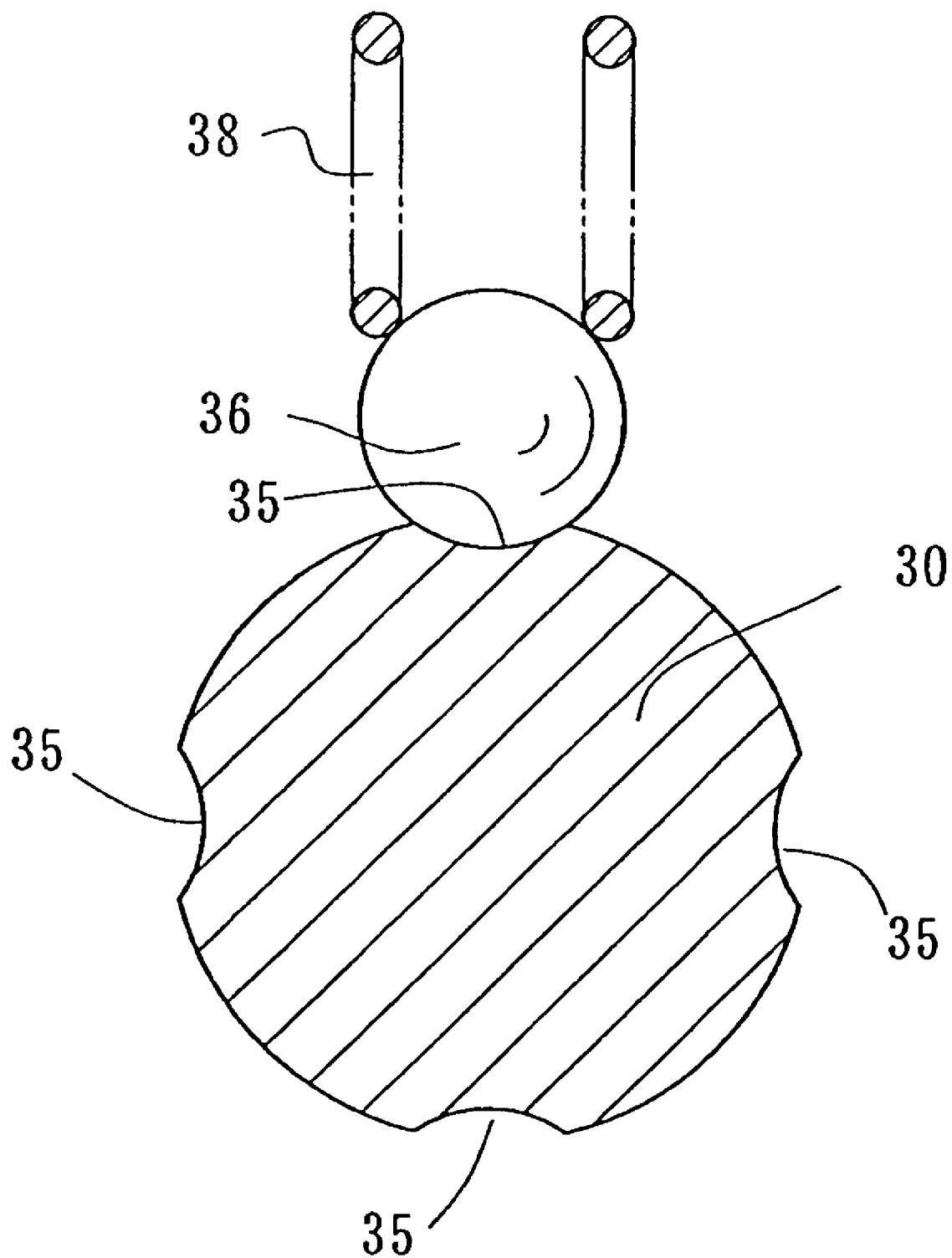
FIG. 6 is a sectional view along line 6-6 of FIG. 5, showing the click ball received within one of four recesses formed in the shank of the adjusting bolt, the recesses formed equidistantly in the circumferential direction.

FIG. 6 is a sectional detail view of the adjusting structure of FIGS. 4-5, according to the illustrative embodiment, showing the engaged condition of the click ball 36 and the anti-turn recessed groove 35, in which the click ball 36 is engaged with the anti-turn recessed groove 35 by being spring-biased by the coil spring 38. In this condition, the click ball 36 cannot be disengaged from the anti-turn recessed groove 35 by overcoming the spring elastic force of the coil spring 38, unless the tension-adjusting bolt 30 is rotated by a force greater than a predetermined value. Thus, under the vibration of the vehicle or the like, the rotation of the tension-adjusting bolt 30 is inhibited, and, as a result, the tension-adjusting bolt 30 is restrained from spontaneously moving in a chain-slackening direction.

In the example shown in the figures, four such anti-turn recessed grooves 35 are provided at intervals of 90° along the circumferential direction of the screw portion 33 of the tension-adjusting bolt 30. Therefore, with the tension-adjusting bolt 30 rotated by 90° at a time, the anti-turn recessed groove 35 and the click ball 36 are engaged with each other. Therefore, the tension adjustment can be performed at a quarter revolution pitch, so that a more precise tension adjustment can be achieved.

In addition, when the tension-adjusting bolt 30 is rotated by overcoming the spring elastic force of the coil spring 38, the click ball 36 is disengaged from the anti-turn recessed groove 35, to enable rotation of the click ball 36. Then, when the screw portion 33, engaged with the threaded hole 34, is rotated normally or reversely, the advancement or retraction amount of the tension-adjusting bolt 30 can be regulated.

Figure 7:
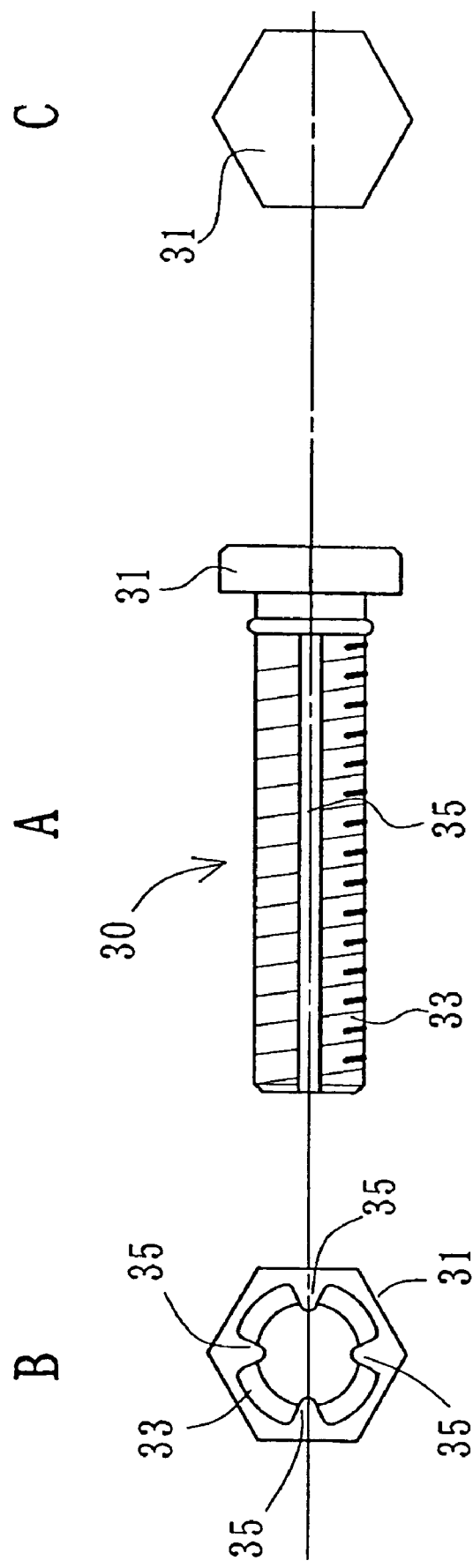
FIG. 7A is side plan view of a tension-adjusting bolt, showing a threaded shank extending from a head.
FIG. 7B is a front view of the tension-adjusting bolt of FIG. 7A, showing the peripheral shape of the adjusting bold shank including four axially extending grooves formed therein.
FIG. 7C is rear elevational view of the tension-adjusting bolt of FIG. 7A, showing the bolt head having a hexagonal shape.

FIGS. 7A-C show the tension-adjusting bolt 30. FIG. 7A is a side view of the tension-adjusting bolt 30, FIG. 7B is a front plan view of the same, and FIG. 7C is a rear plan view of the same. As is clear from these figures, the head portion 31 is hexagonal in shape, for easy rotation by use of a tool.

In addition, the anti-turn recessed grooves 35 are provided at an interval of 90° along the circumferential direction of the screw portion 33 of the tension-adjusting bolt 30. The anti-turn recessed grooves 35 extend axially along the entire length of the screw portion 33, between the tip end of the screw portion 33 and the head portion 31, and can be easily formed by cutting a part of the screw portion 33 by machining.

The functions of this embodiment will now be described. In FIGS. 4 and 5, the position of the tension-adjusting bolt 30 in the front-rear direction of the vehicle is determined by the engagement of its screw portion 33 with the threaded hole 34. Morevoer, the abutment of its head portion 31 on a front edge portion of the slider 25 determines the position of the slider 25.

In this instance, since the slider 25 is normally biased for moving forwards by the tension of the chain, the slider 25 is positioned by abutment on the head portion 31. In addition, since the tension-adjusting bolt 30 is prevented from being turned under forces of about the vibrations of the vehicle body by the engagement of the click ball 36 with the anti-turn recessed groove 35, the tension-adjusting bolt 30 is prevented from being loosened. As a result, the double nut as provided in the related art can be discarded from the adjusting mechanism. Therefore, the weight of the adjusting mechanism 11 is reduced, and a small, but significant reduction in overall weight can be achieved.

In the case of tension adjustment, first, the axle nut 27 is loosened. Subsequently, in order to raise the tension of the chain 10, the tension-adjusting bolt 30 is retracted by reverse rotation thereof. As a result, the head portion 31 pushes the slider 25 rearwards, so that the axle 6 supported by the slider 25 is moved rearwards, thereby augmenting the tension of the chain 10.

On the contrary, for slackening the tension of the chain 10, the tension-adjusting bolt 30 is advanced by normal rotation thereof. Upon this operation, since the slider 25 is biased by the chain 10 for forward movement, the axle 6 is moved forwards together with the slider 25, thereby weakening the tension of the chain 10. After the adjustment is finished, the axle nut 27 is tightened.

Thus, the tension-adjusting bolt 30 can be freely adjusted without requiring a double nut locking arrangement, and, moreover, the adjustment can be carried out more easily and speedily, and the number of operation steps can be reduced, as compared with the prior art double nut fastening operation. In addition, since the tension-adjusting bolt 30 is made waterproof by use of the rubber boot 32, the waterproof properties of the adjustment mechanism are enhanced. In addition, since the grease on the click ball 36 lubricates the screw portion 33 of the tension-adjusting bolt 30, the tension-adjusting bolt 30 is prevented from rusting easily, and durability is thus enhanced. Moreover, the double nut of the prior art is discarded without considerable changes in the support structure for the axle 6, as compared with the related art, so that the weight of the axle support structure is reduced, and a reduction in overall weight can be achieved.

Further, one or a plurality of anti-turn recessed grooves 35 are provided along the circumferential direction of the shank portion of the tension-adjusting bolt 30. Although an illustrative embodiment is disclosed herein showing four anti-turn recessed grooves 35, the invention is not limited thereto. In the cases of plurality, the number and interval of the anti-turn recessed grooves 35 can be arbitrarily set, for example, two at an interval of 180°, three at an interval of 120°, and six at an interval of 60°. Moreover, by forming the anti-turn recessed grooves 35 in a continuous form in the axial direction, the portions can be easily formed by machining or the like, and the anti-turn function can be obtained at an arbitrary position in the axial direction.

In addition, since the spring-biased click ball 36 is engaged with and disengaged from the anti-turn recessed groove 35, rotation of the tension-adjusting bolt 30 enables a swift operation with a click feeling. Moreover, it is also possible to carry out the adjustment while counting the number of clicks.

Incidentally, the present invention is not limited to the above-described embodiment, and can be modified or applied in various manners. For example, the object to which the tension-adjusting bolt 30 is fastened may not necessarily be on the side of the end piece 21, and may be on the side of the slider 25. In this case, the tension-adjusting bolt 30 is so disposed that its head portion 31 abuts on the arm 14 side, for example, on the projecting portion 23.

In addition, an elastic member such as a rubber member may be used for biasing, in place of the coil spring 38. When a rubber member or the like is used, rusting or breakage can be substantially avoided, and durability is increased. Further, the endless drive chain is not limited to the chain, and may be a belt.

While a working example of the present invention has been described above, the present invention is not limited to the working example described above, but various design alterations may be carried out without departing from the present invention as set forth in the claims.

What is claimed is,

1. An adjustable wheel support for a vehicle, the vehicle comprising:
    a power unit;
    a drive wheel having a drive sprocket attached thereto and having an axle disposed centrally therein;
    an endless drive loop member connecting the power unit and the drive sprocket of the drive wheel,
    a wheel support arm supporting the drive wheel on the vehicle and having an adjustment slot formed therein and extending in a front-rear direction of the vehicle; and
    wherein said axle of said drive wheel is inserted through said adjustment slot; the adjustable wheel support comprising:
    a tension-adjusting bolt connecting said wheel support arm to said axle, said axle being adjustably movable in a front-rear direction of said vehicle by rotating said tension-adjusting bolt to thereby adjust the tension of said drive loop member; wherein
    said tension-adjusting bolt is provided with an anti-turn recessed portion, and a lock member elastically engageable with and disengageable from said anti-turn recessed portion, and wherein turning of said tension-adjusting bolt is resisted by engagement of said lock member with said anti-turn recessed portion.

2. The adjustable wheel support claimed in claim 1, wherein a plurality of said anti-turn recessed portions are provided in a shank portion of said tension-adjusting bolt at spaced intervals along the rotating direction.

3. The adjustable wheel support claimed in claim 1, wherein said anti-turn recessed portion is provided as a recessed groove formed in a shank portion of said tension-adjusting bolt, the recessed groove extending in an axial direction along the tension-adjusting bolt.

4. The adjustable wheel support claimed in claim 1, wherein said wheel support arm comprises a projecting portion formed integrally therewith and extending outwardly thereon forwardly of said adjustment slot, said projecting portion having a threaded bore formed therethrough and extending in the front-rear direction of said vehicle;
    wherein a shank portion said tension-adjusting bolt fits threadably in said threaded bore of said projecting portion.

5. The adjustable wheel support claimed in claim 4, wherein said anti-turn recessed portion is provided as a recessed groove formed in a shank portion of said tension-adjusting bolt, the recessed groove extending in an axial direction of the tension-adjusting bolt so as to extend along substantially the entire length of the shank portion.

6. The adjustable wheel support claimed in claim 1, wherein the lock member comprises a ball and an elastic body, the elastic body biasing the ball toward engagement with the anti-turn recessed portion.

7. The adjustable wheel support claimed in claim 4, wherein the lock member comprises a ball and a coil spring disposed within said projecting portion of said wheel support arm, the spring biasing the ball toward engagement with the anti-turn recessed portion.

8. The adjustable wheel support claimed in claim 4, wherein the lock member comprises a ball and an elastic body, the elastic body biasing the ball toward engagement with the anti-turn recessed portion.

9. The adjustable wheel support claimed in claim 1, wherein the tension-adjusting bolt comprises a head and a shank;
    wherein said wheel support arm comprises a projecting portion formed integrally therewith and extending outwardly thereon forwardly of said adjustment slot, said projecting portion having a threaded bore formed therethrough and extending in the front-rear direction of said vehicle;
    and wherein a portion of the shank cooperates via threaded engagement with the threaded bore formed in the projecting portion of the wheel support arm, and wherein the head is maintained in operative engagement with the axle by the tension force of the drive loop member.

10. The adjustable wheel support of claim 4, wherein the tension-adjusting bolt is provided with a water-resistant boot, the boot covering a portion of the shank that is not engaged with the threaded bore of the wheel support arm.

11. The adjustable wheel support of claim 1, further comprising a slider plate surrounding an end portion of said axle, said slider plate slidably contacting an outer surface of said wheel support arm adjacent said adjustment slot, wherein a head portion of said tension-adjusting bolt rests against a side edge of said slider plate.

12. The adjustable wheel support of claim 4, further comprising a slider plate surrounding an end portion of said axle, said slider plate slidably contacting an outer surface of said wheel support arm adjacent said adjustment slot, wherein a head portion of said tension-adjusting bolt rests against a side edge of said slider plate.

13. An adjustable wheel support for a vehicle, the vehicle comprising:
    a power unit;
    a drive wheel having a drive sprocket attached thereto and having an axle disposed centrally therein;
    an endless drive loop member connecting the power unit and the drive sprocket of the drive wheel,
    a pair of spaced apart wheel support arms for supporting the drive wheel on the vehicle, each of the wheel support arms having an adjustment slot formed therein and extending in a front-rear direction of the vehicle, and having an integral projecting portion extending outwardly thereon forward of the adjustment slot and having a threaded bore formed therethrough extending in a front-rear direction of said vehicle;
    wherein respective opposed end portions of said drive wheel axle are inserted through said adjustment slots of said wheel support arms;
    a pair of slider plates, with one of said slider plates surrounding each end portion of said axle outside of said wheel support arms, said slider plates slidably contacting outer surfaces of said wheel support arms adjacent said adjustment slot,;

the adjustable wheel support comprising:

a pair of tension-adjusting bolt, one of said tension-adjusting bolts operatively connecting said wheel support arm to said axle on each side thereof, said axle being adjustably movable in a front-rear direction of said vehicle by rotating said tension-adjusting bolts to thereby adjust the tension of said drive loop member; wherein each of said tension-adjusting bolts is provided with an anti-turn recessed portion, and a lock member elastically engageable with and disengageable from said anti-turn recessed portion, and wherein turning of said tension-adjusting bolt is resisted by engagement of said lock member with said anti-turn recessed portion;

and wherein a head portion of said tension-adjusting bolt rests against a side edge of one of said slider plates on each side of said axle.

14. The adjustable wheel support claimed in claim 13, wherein said anti-turn recessed portion is provided as a recessed groove formed in a shank portion of said tension-adjusting bolt, the recessed groove extending in an axial direction of the tension-adjusting bolt so as to extend along substantially the entire length of the shank portion.

15. The adjustable wheel support claimed in claim 13, wherein the lock member comprises a ball and an elastic body, the elastic body biasing the ball toward engagement with the anti-turn recessed portion.

16. The adjustable wheel support of claim 13, wherein the tension-adjusting bolt is provided with a water-resistant boot, the boot covering a portion of the shank that is not engaged with the threaded bore of the wheel support arm.

17. A method of adjusting an adjustable wheel support for a vehicle, the vehicle comprising:

a power unit;

a drive wheel;

a driven transmission gear comprising an endless drive loop member, the drive loop member connecting the power unit and the drive wheel;

a wheel support arm supporting the drive wheel on the vehicle;

an adjustment slot in the wheel support arm, the adjustment slot extending in the front-rear direction of the vehicle; and an axle for said drive wheel, said axle inserted through said adjustment slot; the adjustable wheel support comprising:

a tension-adjusting bolt connecting said wheel support arm to said axle, wherein said tension-adjusting bolt is provided with an anti-turn recessed portion, and a lock member elastically engageable with and disengageable from said anti-turn recessed portion, and wherein turning of said tension-adjusting bolt is stopped by engagement of said lock member with said anti-turn recessed portion, the method of adjusting the adjustable wheel support comprising the following method steps:

rotating said tension-adjusting bolt in a normal direction so as to move said axle forwardly in the front-rear direction of the vehicle thereby adjusting the tension of said drive loop member so as to decrease the tension of the drive loop member, rotating said tension-adjusting bolt in a reverse direction so as to move said axle rearwardly in the front-rear direction of the vehicle thereby adjusting the tension of said drive loop member so as to increase the tension of the drive loop member, and listening to click sounds generated by the interaction of the lock member and anti-turn recessed portion to determine the extent of the adjustment.

18. The method of adjusting an adjustable wheel support of claim 17, wherein the wheel support arm is provided with graduations formed on a surface thereof adjacent to said tension-adjusting bolt, a further method step comprising:

using said graduations to monitor the position of the axle.

19. The method of adjusting an adjustable wheel support of claim 17, wherein a plurality of said anti-turn recessed portions are provided in a shank portion of said tension-adjusting bolt at spaced intervals along the rotating direction.

20. The method of adjusting an adjustable wheel support of claim 17, wherein said anti-turn recessed portion is a recessed groove formed in a shank portion of said tension-adjusting bolt, the recessed groove extending in an axial direction of the tension-adjusting bolt.

* * * * *